April 29, 1952  J. M. CUNNINGHAM  2,594,737
CONTROL PANEL FOR ACCOUNTING MACHINES
Filed Sept. 29, 1949  5 Sheets-Sheet 2

INVENTOR
JAMES M. CUNNINGHAM
BY
Charles E. McTiernan
AGENT

April 29, 1952  J. M. CUNNINGHAM  2,594,737
CONTROL PANEL FOR ACCOUNTING MACHINES
Filed Sept. 29, 1949  5 Sheets-Sheet 3

INVENTOR
JAMES M. CUNNINGHAM
BY
Charles E. McTiernan
AGENT

April 29, 1952 J. M. CUNNINGHAM 2,594,737
CONTROL PANEL FOR ACCOUNTING MACHINES
Filed Sept. 29, 1949 5 Sheets-Sheet 4

INVENTOR
JAMES M. CUNNINGHAM
BY
Charles C. McTiernan
AGENT

April 29, 1952  J. M. CUNNINGHAM  2,594,737
CONTROL PANEL FOR ACCOUNTING MACHINES
Filed Sept. 29, 1949  5 Sheets-Sheet 5

INVENTOR
JAMES M. CUNNINGHAM
BY
Charles E. McTierna
AGENT

Patented Apr. 29, 1952

2,594,737

UNITED STATES PATENT OFFICE 2,594,737

CONTROL PANEL FOR ACCOUNTING MACHINES

James M. Cunningham, Endicott, N. Y., assignor to International Business Machines Corporation, New York, N. Y., a corporation of New York Application September 29, 1949, Serial No. 118,674

8 Claims. (Cl. 173—328)

1

This invention relates to electric plugboards for perforated record controlled accounting machines and more specifically to a mechanism for controlling the movement of these plugboards.

In the operation of electrical accounting machines, perforated record cards bearing separate columns of data are fed into the machine where they are to be sensed by separate brushes. When a punched hole in any column allows the corresponding brush to contact the conductor roll, an electrical circuit is completed thereby making available an electrical impulse from this circuit. The electrical impulse travels to the control panel associated with the machine where by means of a predetermined plugging arrangement this impulse may be directed to a type bar where the data can be listed, to a counter where the data can be added or subtracted, to a comparing position where the information can be compared, or the data can be eliminated completely.

During the normal operation of these record controlled machines it has been the practice that different reports are to be made from the record cards which are to be run through the machine thus necessitating a complete plugging of the machine for each report. In order to decrease such time consuming operations, set-up plugboards may be maintained in a plugged or connected condition for each report to be made and inserted as a complete unit in the machine whenever it is desired to use them.

The set-up plugboards or control panel are adapted to be inserted in a carrier, which is pivoted at one end of the fixed plugboard, and swung and lifted into contact position with the fixed plugboard. As the panel is brought into close proximity of the fixed plugboard, the lower contacts thereof come into contact position with the corresponding contacts of the panel before those contacts disposed nearer to the top of the fixed plugboard. As a result during the lifting action there is created an uneven distribution of contact pressure whereby the control panel becomes warped and distorted such that the contacts in the warped area of the control panel will not engage the contacts of the fixed plugboard.

The principal object of the invention is to provide a plugboard arrangement which will eliminate the buckling of the plugboards and substantially reduce the vertical misalignment of the contact members.

Another object of the invention is to provide a locking means which will prevent the operation of the plugboard carrier arrangement to a closed position whenever the set-up plugboard is not fully seated therein.

A further object of the invention is to provide a pivotable split plugboard cover which facilitates the ready removal or insertion of the control panel from the carrier.

Still another object of the invention is to provide a plugboard arrangement wherein the control panel is first swung into a parallel position with respect to the fixed plugboard with the contacts thereof then lifted into engagement with the contacts of the fixed plugboard.

Other objects of the invention will be pointed out in the following description and claims and illustrated in the accompanying drawings, which disclose, by way of example, the principle of the invention and the best mode, which has been contemplated, of applying that principle.

In the drawings:

Fig. 4 is a perspective view of the slotted bracket, which is secured to the bottom side of the carrier, which has attached thereto a locking device which prevents the carrier from being swung into a closed position whenever the control panel is not properly seated therein.

Figure 6:
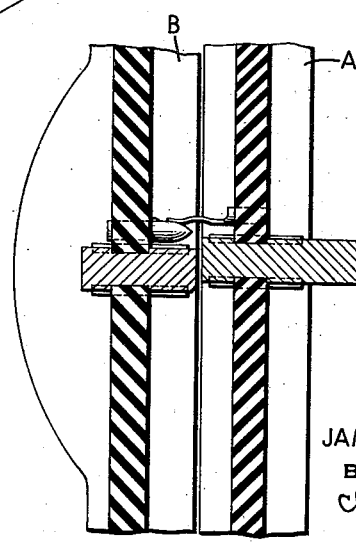
Fig. 6 is a sectional view showing the cooperation between the contacts when the plugboard is in a closed position.

Referring to the drawings, the stationary plugboard A having a plurality of contact members, some of which are coupled to the sensing brushes of the machine while others are coupled to various control parts, is secured to an electrical accounting machine M. The removable plugboard or control panel B also contains a plurality of cooperating contact members which contact the members of the stationary plugboard, such as shown in Fig. 6, when the plugboard is in a closed position thereby completing the circuit for which the removable board has been plugged and enabling the machine to sense those record cards from which the desired information is sought. The removable plugboard B is capable of being readily seated within the plugboard carrier C in order that it may be brought into a closed position by the plugboard mechanism to be subsequently described.

Figure 1:
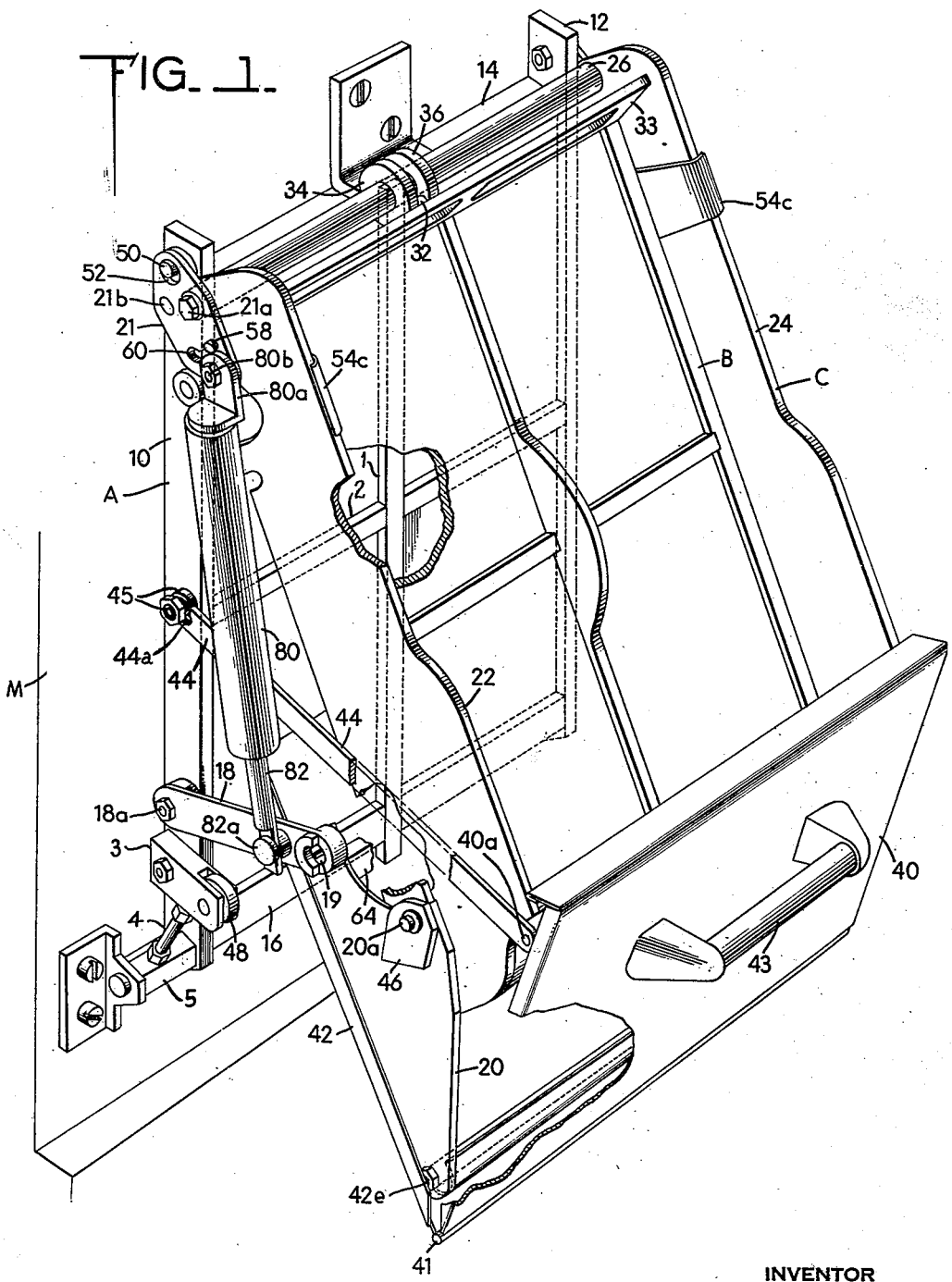
Fig. 1 is a perspective view partly cut-away of the plugboard unit in an open position and with the control panel properly seated within the carrier.

The stationary or fixed plugboard A, as shown in Fig. 1, which is secured to the main frame of the accounting machine M comprises a frame having side bars 10 and 12, top and bottom bars 14 and 16 and cross bars 1 and 2 suitably positioned so as to support four non-conductive panels containing a plurality of rows and columns of spring type electrical contactors such as shown in Fig. 6. The bar 1 extends beyond the lower and upper limits respectively of the bars 14 and 16 for purposes to be subsequently described. At the lower portion of each of the side bars 10 and 12 there is affixed thereto an adjustably mounted roller 48 which cooperates with the cam block 46 for the purposes of aligning the removable plugboard with the fixed plugboard in a manner to be described subsequently.

Figure 2:
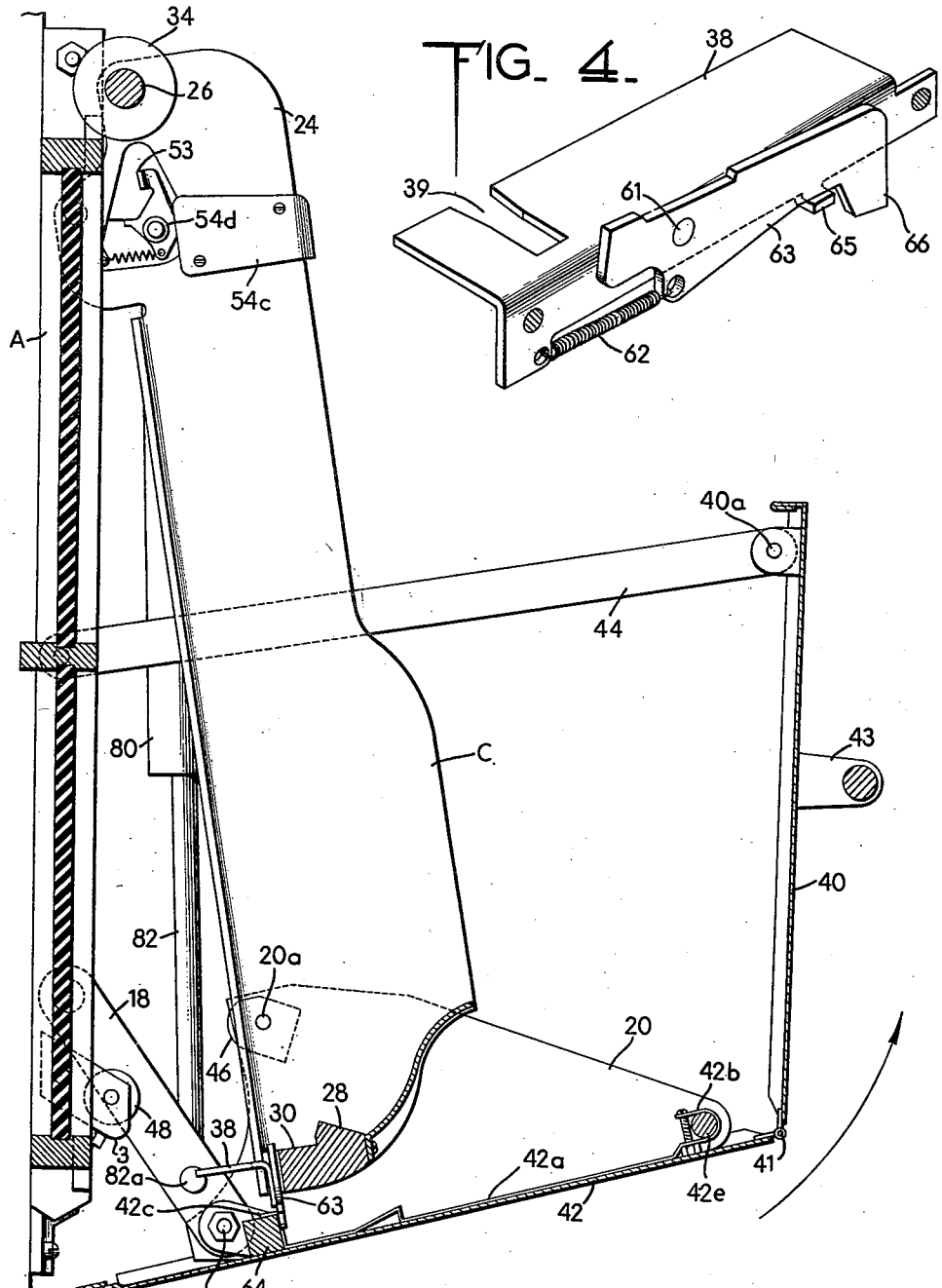
Fig. 2 is a sectional view of the plugboard in an open position and showing the functioning of the carrier locking device.

The movable members of the plugboard mechanism comprise in general a split cover panel having sections 40 and 42 which are hinged to each other at 41 with an operating handle 43 attached to the upper section 40, a plugboard carrier C and linkage 18, 20 and 21 which connects the carrier to the fixed board A which, in turn, is securely fastened to the frame of the machine M. The upper panel section 40 has secured thereto two studs 40a disposed one on each of the vertical sides of the panel and lying in the same horizontal plane with one of said studs being shown in Fig. 2. The two studs 40a are each connected to the stationary or fixed plugboard A by means of a link 44 which is at one end rotatably coupled to the stud associated therewith and at the other end adjustably connected to the fixed plugboard A through the combination of a slot 44a in the link 44 and the clamping means 45 secured to the board A. This adjustment feature provides a means of lining up the split panels with respect to the adjoining covers on the machine. The lower panel section 42 is provided with an inner panel 42a, such as shown in Fig. 2, with the upper portion 42b of the inner panel shaped in the form of an inverted U straddling and secured to the cross connecting bar 42e while the lower portion 42c (see Fig. 2) of the inner panel straddles the connecting bar 64 and which panel 42a in conjunction with the link 20 firmly couples the split panel sections 40 and 42 to the plugboard carrier C.

The plugboard carrier C, as shown in Fig. 1, comprises a pair of side frames 22 and 24 spaced in parallel relationship to each other by a shaft 26 at the top and a plugboard support rail 28 (see Fig. 2) having a guide rail 30 at the bottom.

The shaft 26 has affixed centrally thereto a pair of discs 34 and 36 which cooperate with the raised portion 32 of the control panel B and the upper extension of the bar 1 of the plugboard A for the purpose of aligning primarily plugboards A and B with respect to each other and secondarily for aligning the panel B with respect to the carrier C. The rail 28 has centrally secured thereto a rightangle bracket 38, such as shown in Fig. 4, having a slot 39 in the horizontal side of the bracket which coacts with the lower extension of the bar 1 thereby aiding in the proper alignment of the carrier with the stationary board A when in a closed position. Pivotally secured to the vertical leg of the angular bracket is a spring biased carrier locking device 63, the functioning of which shall be described subsequently. The guides 54c secured to the inside of each of the side frames are employed for the purpose of directing the removable plugboard into a proper setting arrangement with the carrier.

The carrier C is rotatably secured to the fixed plugboard A by means of the link connections 18, 20, and 21 disposed on each side of the panel with the connections of one side shown in Fig. 1. The carrier at the upper end thereof is attached to the board A by means of the link 21 which is rotatably secured to the extremities of the cross bar 26 at the pivot point 21a and which is also rotatably mounted at the point 21b on a stud which is fixed to the top of the side frames of the fixed plugboard A. The link 21 is further provided with a slot 60 (see Fig. 7a) which cooperates with the locking means to be described subsequently and an opening 52 into which is projected a stud 50 secured to the fixed board A. This arrangement between the opening 52 and the stud 50 establishes the limits of displacement through which the link 21 may be rotated about the pivot point 21b. The lower portion of the carrier is connected to the fixed plugboard through the medium of the links 18 and 20. The link 20 is rotatably coupled at the point 20a to the carrier C while at two other points the link 20 is secured to the cross bars 64 and 42e (see Fig. 2). The link 18 is rotatably secured at one end thereof to the link 20 at the point 19 which is in the immediate vicinity of the connection of the link to the bar 64 and at the other end at the point 18a to the fixed plugboard A. A cam block 46 is fixed to the link 20 at the pivot point 20a and cooperates with the adjustably mounted rollers 48 when the plugboard is in a closed position so as to force the carrier and the removable plugboard upward relative to the stationary plugboard for the purposes of attaining a proper alignment and better contact with the spring contacts of the stationary plugboard. Each of the rollers 48 is coupled to the plugboard A by the support member 3 being secured at one end thereof to the side of the frame A. An auxiliary positioning support means 4 which is angularly disposed with respect to the underside of the member 3 has one end thereof adjustably coupled to the bar 5 while the other end supports the member 3 intermediate the ends thereof. Thus it is to be noted that by varying the length of the member 4 that the tension extended on the contacts due to the block 46 riding on the rollers 48 may likewise be varied.

In order to prevent a forced closing of the plugboard and thus resulting in the contacts being damaged, a carrier locking device is provided to prevent the closing of the mechanism unless the removable plugboard B is properly seated in the guide rail 30 of the carrier. This lock, which is shown in Fig. 4, comprises a vertically disposed member 63 pivotally mounted at 61 to the bracket 38 and urged in a clockwise direction by a spring 62 against the stop 65 which is attached to the bracket 38. When the removable plugboard B is not properly seated within the rail 30, the member 63 will remain at the normal position thereof which is that of being biased against the stop 65 such that the tongue portion 66 of the member 63 will strike the cross bar 64, such as shown in Fig. 2, thus preventing the closing of the mechanism. During the time when the control panel or removable plugboard B is being swung into a closed position and the control panel is properly seated within the guide rail 30 of the carrier C, the bottom bar of the control panel exerts a force against the spring biased effect of member 63 thus rocking the same in a counterclockwise direction about the point 61 thereby permitting the tongue portion 66 to clear the bar 64 and enabling the control panel to come into a closed position with the fixed plugboard.

Figure 5:
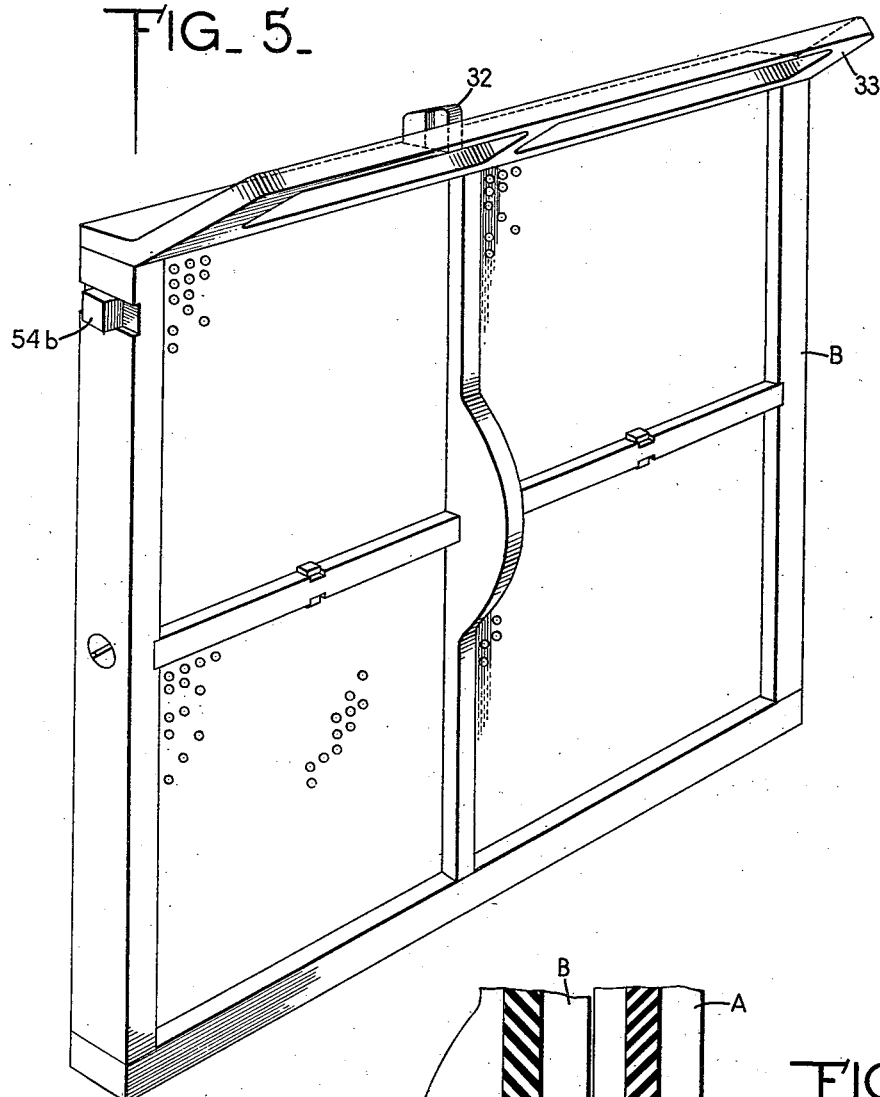
Fig. 5 is a front elevational view of the control panel.

In Fig. 5 there is shown the removable connector board B which is similar in construction to the fixed plugboard A. The top bar of this frame is formed with slots for hand grips 33 in order to facilitate the removal and insertion of the board from the carrier. The top bar of the frame of the removable board B also contains a raised portion 32 which, when the board is inserted in the carrier, fits between the discs 34 and 36 thereby aiding in the centering of the board A within the carrier such as shown in Fig. 1. It is to be noted that inasmuch as the discs 34 and 36 also straddle the upper extension of the bar 1 of the frame A that the removable panel B also is aligned directly with the board A. The outer portion of each of the side bars of the removable plugboard contains a stud 54b upon which the locking means, to be described subsequently, acts thereby securing the removable board within the carrier.

Figure 7A:
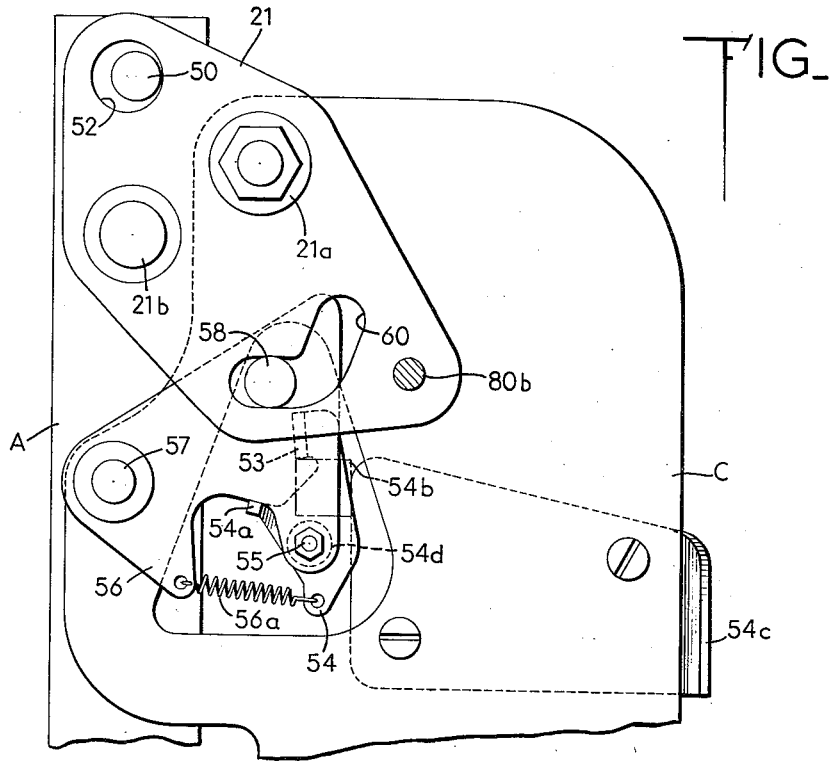
Fig. 7a is a detail view of the plugboard locking mechanism when the plugboard is in a closed position.
Figure 7B:
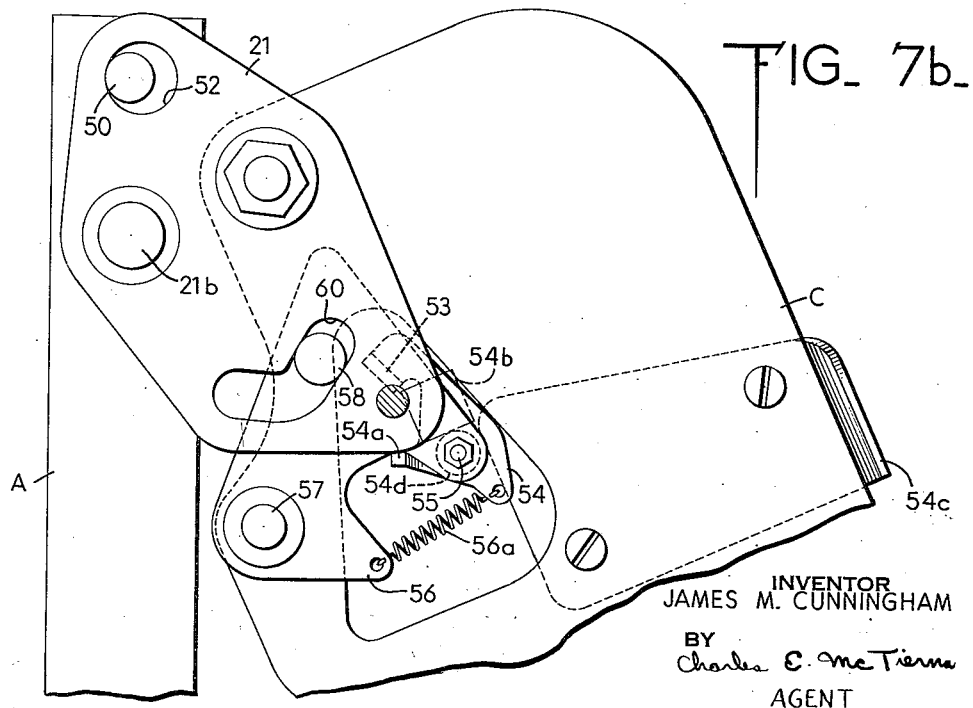
Fig. 7b is a detail view of the plugboard locking mechanism when the plugboard is in an open position.

The plugboard locking means serves to lock the control panel B in the carrier only when the panel is properly seated within the carrier. This lock forces the panel B downwardly against the guide rail 30 thus preventing any unwanted up shifting of the plugboard as the plugboard operating means is being shifted to a closed position. The mechanism comprising the locking means is shown in Figs. 7a and 7b. The locking mechanism comprises a locking pawl 54 rotatably mounted on pivot 55 which is mounted on a supporting member 56. The pawl 54 is further provided with an offset portion 54a which serves as a stop to hold the pawl in a given position with respect to the member 56. Further integral parts of the pawl 54 are the offset 53 which cooperates with the top surfaces of the plugboard studs 54b and the stud 54d which serves as a means for raising the plugboard to the level of the plugboard guides 54c thus eliminating any unnecessary lifting action by the operator for the removal of the board from the carrier. The spring 56a is connected between the members 56 and 54 tending to urge the pawl in a clockwise direction with the offset portion 54a limiting the clockwise movement of the pawl 54.

The pawl supporting member 56 is provided with a stud 57 which is rotatably secured to the carrier and with a roller 58 which is confined within the contour of the slot 60 which is provided in the link 21. The position of the supporting member 56 relative to the carrier C is controlled by the roller 58.

Figure 3:
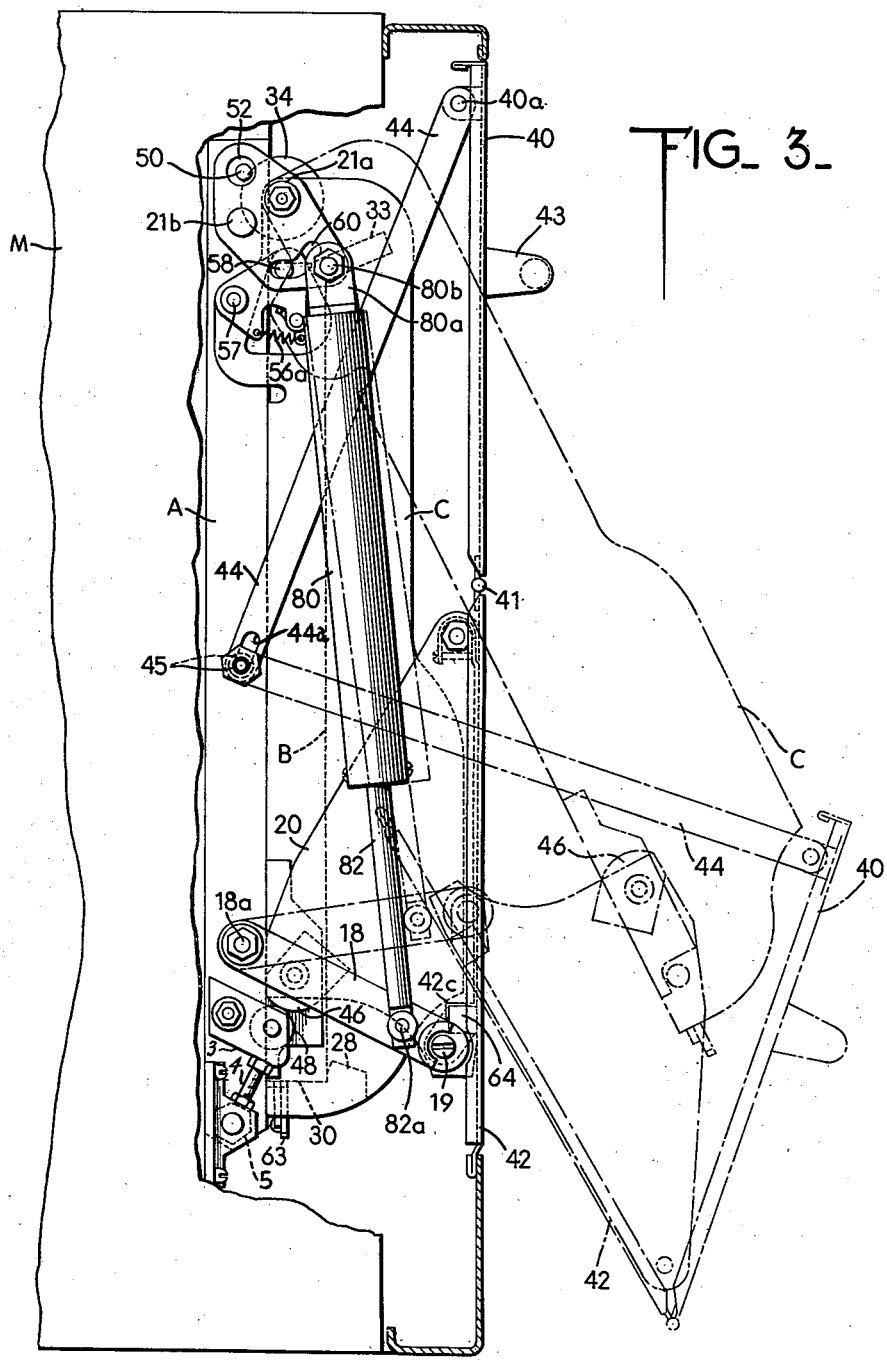
Fig. 3 is a side elevational view of the plugboard frame mechanism with the operating position shown in full lines and the open position shown in dotted outline.

A pair of control cylinders, one on each side of the plugboard mechanism with one of such being shown in Fig. 3, are coupled between the links 18 and 21 so as to exert a force on the link 21 and thus constantly urging the bracket in a clockwise direction about the pivot point 21b.

Each control cylinder comprises a cylinder 80, a piston (not shown) and a connecting rod 82. The top end of the cylinder is sealed to provide a closed air chamber between the piston and the top portion thereof. The top portion of the cylinder is further provided with a fastener 80a which is rotatably secured to the link 21 at pivot 80b, a compression spring (not shown) surrounding the piston rod 82 is disposed between the piston and a collar 84 which is secured to the bottom end of the cylinder and through which the piston rod extends. The bottom end of the piston rod is freely connected at pivot 82a to the link 18.

The control cylinders are further equipped with a small vent hole (not shown) through which air is expelled during the up-stroke of the link 18 thereby limiting the rate of opening of the mechanism especially during the time when the panel 40 is approaching the final open position thereof during the closing operation of the mechanism when the link 18 is being forced downward by the rod 82 there is no checking action by the cylinders thus facilitating the closing of the mechanism. The control cylinder also serves as a lock to hold the plugboard mechanism in either a closed or an open position by virtue of the final position assumed by the link 18 with respect to the cylinder in both the open and closed position of the plugboard.

*Operating cycle*

In the description of the functioning of the plugboard mechanism, it shall be assumed that the mechanism is in its open position as shown in outline in Fig. 3. In this open position the panels 40 and 42 and the carrier C are positioned out and away from the fixed plugboard A while the position of the roller 58, which is secured to the supporting member 56, within the slot 60 and the location of the stud 50 in the opening 52 is that as shown in Fig. 7b. Upon inserting the removable plugboard or control panel B into the carrier C, the raised portion 32 fits between the discs 34 and 36 which discs likewise cooperate with the upper extension of the bar 1 of the plugboard A thereby directly aligning the panel B with the board A as well as centering the panel B within the carrier C. While in this initial position the plugboard studs 54b are resting upon the members 54d (see Fig. 7b) prior to the start of the operation necessary to bring the contacts of the two boards into engagement with each other.

It should be noted at this point that the position of the control panel B in the carrier C at the open position thereof renders the panel readily accessible for any minor changes in the plugging arrangement that may be required for a different report thereby eliminating the unnecessary removal of the panel from the carrier in order to make such a change.

The unit comprising the control panel is now prepared to be moved into contact with the fixed plugboard A which is done by pulling up and in on the handle 43 attached to the panel 40.

The motion imparted to the unit by the application of the force applied to the handle 43 results in the carrier C rotating in a clockwise direction about the point 21a and being accompanied by the pawl supporting member 56 which is rotatably coupled to the carrier C at the point 57. During the time when the member 56 is moving in a clockwise direction with the carrier C, the roller 58 is moving in a downwardly direction in the slot 60 thereby rotating the member 56 clockwise about the point 57. As the member 56 is rotating about the point 57, the offset 53 of the pawl 54, which is pivotally coupled to the member 56 at point 55, is moved into a position of initially falling on top and then effectively locking the plugboard studs 54b. The offset 53 during the initial stages of the closing operation exerts a downward force upon the panel B through contact with the studs 54b thereby bringing the panel B to rest upon the guide rail 30. Upon being properly seated on the rail 30 the panel B overcomes the spring bias of the carrier locking device by rocking the tongue portion 66 of the member 63 in a counter-clockwise direction such that the tongue will clear the bar 64 and enable the mechanism to be closed. If the board B is not properly seated within the carrier C it will not be forced down upon the rail 30 to overcome the bias of the member 63 hence upon the attempt to close the mechanism the tongue 66 of member 63 will contact the bar 64 thereby avoiding damage to the contacts. While the control panel is being rocked into a closed position, the link 20 rotates in a counter-clockwise direction about the point 19, which is being forced downwardly, such that the cam block 46 approaches the vicinity of the roller 48, the link 18 rotates in a clockwise direction around the pivot point 18a thereby forcing the piston rod 82 downward and the carrier C pivots about the point 21a while following the path of motion made for it by the pivotal connection 20a between the link 20 and the lower end of the carrier C. As a result of the various aforementioned linkage movements the control panel B is swung into a position parallel to the stationary plugboard A with the contacts of the board B disposed in an overlapping fashion midway between the adjacent horizontal rows of the contacts on the board A. Then as the cam blocks 46 ride up on the rollers 48 thereby lifting the carrier C there begins a parallelogram movement in which the contacts on the upper end of the board B approach and engage the contacts on the fixed board A with substantially the same motion as those at the lower end. This parallelogram movement is brought about by the rocking of the link 21 about the point 21b which, due to the pivotal connection 21a, moves the carrier C inward and upward when the cam blocks 46 ride upon the rollers 48. The path of movement of the lower end of the carrier C is determined by the contour of the cams 46 while the path of movement of the upper frame is determined by the location of the pivotal connection 21a with respect to the pivot 21b. During this final movement of the carrier and the removable plugboard when the pivotal connection 21a is moving around the pivot 21b the position of the stud 50 is relatively shifted within the opening 52 to that shown in Fig. 7a while the stud 58 assumes the position within the slot 60 also shown in Fig. 7a. In this final phase of the cycle the slot 39 in the bracket 38, which is secured to the carrier, cooperates with the extension of the bar 1 in the fixed plugboard A thus aligning the carrier with respect to the fixed board. While in this closed position the control cylinders on each side of the unit lock the unit in place by virtue of the final position assumed by the link 18.

In order to return the unit to the open position a pulling force is exerted on the handle resulting in the cam blocks 46 rolling off the rollers 48 so that the contacts of the removable board B are no longer forced upward against the spring contacts of the fixed board A and also resulting in the link arrangement unfolding until the mechanism assumes the open position shown in outline in Fig. 3. Near the end of this movement the lock which holds the removable board B seated in the carrier is cammed open so that the removable connector board may be lifted from the carrier and replaced by another removable board.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In an interconnecting plugboard for an electrical accounting machine comprising a first plugboard secured to said machine and having a first set of contacts, a plugboard carrier, a split panel cover having an upper and lower panel sections pivotally coupled, a first linkage means connected to said lower panel, said linkage means being pivotally connected to said carrier, a second linkage means having limited movement coupled to the upper portion of said first plugboard, said carrier being rotatably connected to said second linkage means, said upper panel being adjustably coupled to said first plugboard, a third linkage means coupling said lower panel to the lower portion of said first plugboard, cam means secured to said first linkage means, roller means connected to the lower portion of said first plugboard, a second plugboard adapted to be inserted in said carrier and having stud elements near the upper part thereof, said second plugboard having a second set of contacts adapted to cooperate with said first set of contacts, means associated with said carrier to prevent said contacts from coming in contact with each other when said second plugboard is not properly seated within said carrier, means integral with said carrier for aligning said second plugboard with said first plugboard, plugboard locking means connected to said carrier, means swinging said panels into a closing position whereby said second contacts are first swung into a parallel position and are then lifted into contact position by the action of said cam block means riding up on said roller means, said second plugboard being locked in said carrier by said locking means when said carrier is being swung into a closed position, and means for aligning said carrier with respect to said first plugboard when in a closed position.

2. In an interconnecting plugboard as claimed in claim 1 wherein said means aligning said second plugboard with said first plugboard comprises a raised portion on the upper part of each of said plugboards which coacts with a pair of spaced discs centrally disposed on the upper portion of said carrier.

3. In an interconnecting plugboard as claimed in claim 1 wherein said locking means comprises a supporting member rotatably supported with respect to said carrier, said member having pivotally secured thereto a spring biased locking pawl, said pawl having disposed thereon an offset portion and stud means whereby when said carrier is being moved into a closed position said offset portion and stud means effectively operate on said plugboard studs thereby locking said second plugboard in said carrier.

4. In an interconnecting plugboard as claimed in claim 1 wherein said means for aligning said carrier with said first plugboard comprises a vertically extending tongue portion of the lower part of said first plugboard which meshes with a groove formed in the lower portion of said carrier.

5. A plugboard locking means comprising a fixed plugboard, linkage means rotatably coupled to said plugboard and including a slotted portion, a plugboard carrier pivotably coupled to said linkage means, a control panel adapted to be carried by said carrier and having associated stud means, a supporting member pivotably coupled to said carrier and having associated roller means, said roller means adapted to cooperate with said slotted portion, a locking pawl coupled to said supporting member, said locking pawl engaging said stud means to secure said panel in said carrier, said carrier upon being moved relative to said fixed plugboard causing said roller means to ride in said slotted portion whereby said supporting member causes said pawl to engage said stud.

6. A plugboard locking device comprising a fixed plugboard, linkage means having a slotted portion pivotably coupled to said plugboard, a plugboard carrier pivotably coupled to said linkage means, a removable plugboard adapted to be inserted in said carrier, a pawl locking member pivotably coupled to said carrier and adapted to engage said removable plugboard, said locking member having roller means adapted to cooperate with said slotted portion such that when said carrier is moved relative to said fixed plugboard said locking member will securely lock said removable plugboard in said carrier.

7. A plugboard locking device comprising a first plugboard, linkage means pivotably coupled to said plugboard, a plugboard carrier pivotably coupled to said linkage means, a second plugboard carried by said carrier, locking means pivotably coupled to said carrier, said locking means being controlled by said linkage means such that when said carrier is moved relative to said first plugboard said second plugboard will be locked in position in said carrier.

8. A control panel locking device comprising a plugboard, a limited moving linkage means pivotably coupled to said plugboard, carrier means pivotably coupled to said linkage means and adapted to receive a control panel, a locking member operably coupled to said carrier, said member being controlled by said linkage means such that said panel will be secured in said carrier when said carrier is moved relative to said plugboard.

JAMES M. CUNNINGHAM.

REFERENCES CITED

The following references are of record in the file of this patent:

UNITED STATES PATENTS

| Number | Name | Date |
|---|---|---|
| 1,957,773 | Good | May 8, 1934 |
| 2,111,118 | Lake | Mar. 15, 1938 |
| 2,355,913 | Simon | Aug. 15, 1944 |
| 2,407,176 | Piatt et al. | Sept. 3, 1946 |
| 2,434,534 | Alford | Jan. 13, 1948 |
| 2,465,540 | Korn | Mar. 29, 1949 |